United States Patent [19]

Li et al.

[11] 4,197,263

[45] Apr. 8, 1980

[54] HIGH NITRILE RESINS CONTAINING MALEIC ANHYDRIDE

[75] Inventors: George S. Li, Aurora; John F. Jones, Cuyahoga Falls, both of Ohio

[73] Assignee: The Standard Oil Company, Cleveland, Ohio

[21] Appl. No.: 944,109

[22] Filed: Sep. 20, 1978

Related U.S. Application Data

[63] Continuation of Ser. No. 806,577, Jun. 15, 1977, abandoned.

[51] Int. Cl.² ............................................. C08F 279/02
[52] U.S. Cl. ..................................... 525/207; 525/222
[58] Field of Search ............................ 260/879, 878 R

[56] References Cited

U.S. PATENT DOCUMENTS 4,127,617   11/1978   Arrighetti et al. ............... 260/878 R

*Primary Examiner*—William F. Hamrock
*Attorney, Agent, or Firm*—John F. Jones; Larry W. Evans

[57] ABSTRACT

Polymeric compositions having high softening temperatures, good gas barrier properties and low creep properties are composed of an olefinically unsaturated nitrile, another monovinyl component and maleic anhydride and optionally a diene monomer.

10 Claims, No Drawings

HIGH NITRILE RESINS CONTAINING MALEIC ANHYDRIDE

This is a continuation of U.S. patent application Ser. No. 806,577, filed on June 15, 1977, abandoned.

This invention relates to novel polymeric compositions which have high heat-distortion temperatures, good gas barrier properties and low creep characteristics which are composed of an olefinically unsaturated nitrile, another monovinyl component and maleic anhydride and optionally a conjugated diene monomer, and to the process for manufacture of these compositions.

The novel polymeric products of this invention are prepared by polymerizing a major portion of an olefinically unsaturated nitrile, such as acrylonitrile, and a minor portion of another monovinyl monomer component which must include maleia anhydride optionally in the presence of a preformed rubbery polymer composed of a conjugated diene monomer, such as butadiene.

The conjugated dienes useful in this invention include butadiene-1,3, isoprene, chloroprene, bromoprene, cyanoprene, 2,3-dimethyl butadiene, and the like. Most preferred for the purpose of this invention are butadiene and isoprene because of their ready availability and their excellent copolymerization properties.

The olefinically unsaturated nitriles useful in this invention are the alpha,beta-olefinically unsaturated mononitriles having the structure

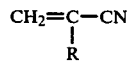

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitrile is acrylonitrile.

The other monovinyl monomer component copolymerizable with the olefinically unsaturated nitriles which are useful in this invention includes one or more of the vinyl aromatic monomers, esters of olefinically unsaturated carboxylic acid, vinyl esters, vinyl ethers, alpha-olefins, and others.

The vinyl aromatic monomers include styrene, alpha-methyl styrene, the vinyl toluenes, the vinyl xylenes, and the like. Most preferred are styrene and alpha-methyl styrene.

The esters of olefinically unsaturated carboxylic acids include those having the structure

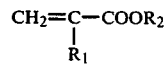

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred in the present invention are methyl acrylate, ethyl acrylate, methyl methacrylate, and ethyl methacrylate.

The alpha-olefins useful in the present invention are those having at least 4 and as many as 10 carbon atoms and having the structure

wherein R' and R" are alkyl groups having from 1 to 7 carbon atoms, and more specifically preferred are alpha-olefins such as isobutylene, 2-methyl butene-1, 2-methyl pentene-1, 2-methyl hexene-1, 2-methyl heptene-1, 2-methyl octene-1, 2-ethyl butene-1, 2-propyl pentene-1, and the like. Most preferred is isobutylene.

The vinyl ethers include methyl vinyl ether, ethyl vinyl ether, the propyl vinyl ethers, the butyl vinyl ethers, methyl isopropenyl ether, ethyl isopropenyl ether, and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates, and the like. Most preferred is vinyl acetate.

Maleic anhydride is an essential component of the novel compositions embodied in this invention.

The polymeric compositions of the present invention can be prepared by any of the known general techniques of polymerization, including the bulk polymerization, solution polymerization, and emulsion or suspension polymerization techniques by batch, continuous or intermittent addition of the monomers and other components. The preferred method is by solution polymerization in the presence of a suitable solvent and a free-radical generating polymerization initiator at a temperature in the range of from about 0° to 100° C. in the substantial absence of molecular oxygen.

The rubbery polymers which may be included in the resins of this invention are homopolymers of the conjugated diene monomers mentioned above as well as copolymers of these dienes and another monomer component such as acrylonitrile, styrene, ethyl acrylate, and mixtures thereof, wherein there is present at least 50% by weight of the total monomers of the conjugated diene monomer.

The preferred polymeric compositions embodied herein are those resulting from the polymerization of 100 parts by weight of (A) at least 50% by weight of at least one nitrile having the structure

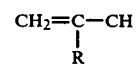

wherein R has the foregoing designation, (B) from 1 to 30% by weight of maleic anhydride, and (C) from 5 to 25% by weight based on the combined weight of (A) plus (B) plus (C) of at least one member selected from the group consisting of (1) styrene or alpha-methyl styrene, (2) an ester having the structure

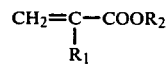

wherein $R_1$ and $R_2$ have the foregoing designations, (3) an alpha-olefin having the structure $$CH_2=C\begin{matrix}R'\\|\\|\\R''\end{matrix}$$

wherein $R'$ and $R''$ have the foregoing designations, (4) a vinyl ether selected from the group consisting of methyl vinyl ether, ethyl vinyl ether, the propyl vinyl ethers, and the butyl vinyl ethers, and (5) vinyl acetate, in the presence of from 0 to 40 parts by weight of (D) a rubbery polymer of a conjugated diene monomer selected from the group consisting of butadiene and isoprene and optionally at least one comonomer selected from the group consisting of styrene, a nitrile monomer having the structure $$CH_2=\underset{R}{\overset{|}{C}}-CN$$

wherein R has the foregoing designation, and an ester having the structure $$CH_2=\underset{R_1}{\overset{|}{C}}-COOR_2$$

wherein $R_1$ and $R_2$ have the foregoing designations, said rubbery polymer containing from 50 to 100% by weight of polymerized conjugated diene and from 0 to 50% by weight of comonomer. Preferably, component (A) should be present in from about 60 to 90% by weight, component (B) should be present in from 1 to 30% by weight and component (C) should be present in from 5 to 25% by weight based on the combined weight of (A) plus (B) plus (C).

The novel polymers produced by the process of this invention are readily processed thermoplastic materials which can be thermoformed into a wide variety of useful articles in any of the conventional ways employed with known thermoplastic materials, such as by extrusion, milling, molding, drawing, injecting, etc. The polymeric products of this invention have excellent solvent resistance and their impact strength and low permeability to gases and vapors make them useful in the packaging industry, and they are particularly useful in the manufacture of bottles, film, sheet, pipes and other types of containers for liquids and solids.

In the following illustrative examples, the amounts of ingredients are expressed in parts by weight unless otherwise indicated.

EXAMPLE 1

A. An acrylonitrile-styrene copolymer which is outside the scope of the present invention was prepared in a polymerization reactor to which were added 75 parts of acrylonitrile, 3 parts of styrene and 75 parts of methyl ethyl ketone. The mixture was stirred and brought to 76° C. under an atmosphere of nitrogen. A feed of 22 parts of styrene, 25 parts of methyl ethyl ketone and 0.3 part of azobisisobutyronitrile was added continuously and uniformly over a 4.5-hour period. The final reaction mixture was maintained at 76°–78° C. for an additional hour. The overall conversion of monomers to polymer was 68% of theory.

The contents of the reactor were poured into a stirred mixture of 1:1 by volume benzene:petroleum ether. The solid polymer was isolated and dried at reduced pressure and 45°–60° C. for 48 hours. This resin was found to have an ASTM heat-distortion temperature of 84°–94° C., a flexural strength of $17.1\times10^3$ psi, a flexural modulus of $5.50\times10^5$ psi, a tensile strength of $14.1\times10^3$ psi, an oxygen transmission rate of 3.5 cc-mil/100 inches$^2$/24 hours/atmosphere and a water vapor transmission rate of 8.0 gm-mil/100 inches$^2$/24 hours/atmosphere.

B. An acrylonitrile-styrene-maleic anhydride terpolymer which is within the scope of the present invention was prepared by the procedure of A of this Example except that the continuous feed was made up of 5 parts of maleic anhydride, 17 parts of styrene, 25 parts of methyl ethyl ketone and 0.3 part of azobisisobutyronitrile and the continuous feed was added uniformly over a 5-hour period. The overall conversion of monomers to polymer was 80% of theory. The resin thus produced was found to have an ASTM heat-distortion temperature of 102° C., a flexural strength of $18.7\times10^3$ psi, a flexural modulus of $6.06\times10^5$ psi, a tensile strength of $15.2\times10^3$ psi, an oxygen transmission rate of 4.6 cc-mil/100 inches$^2$/24 hours/atmosphere and a water vapor transmission rate of 0.9 gm-mil/100 inches$^2$/24 hours/atmosphere.

EXAMPLE 2

The procedure of Example 1A was followed except that the initial reactor charge was 70 parts of acrylonitrile, 2.8 parts of styrene, 75 parts of methyl ethyl ketone and the continuous feed was made up of 5 parts of maleic anhydride, 22.2 parts of styrene, 25 parts of methyl ethyl ketone and 0.3 part of azobisisobutyronitrile. The continuous feed was added uniformly over a 6-hour period. The overall conversion of monomers to polymer was 81% of theory. The resulting resinous polymer was found to have an ASTN heat-distortion temperature of 104° C., a flexural strength of $18.9\times10^3$ psi, a flexural modulus of $6.13\times10^5$ psi and a tensile strength of $14.2\times10^3$ psi.

EXAMPLE 3

A polymer was prepared by the procedure described in Example 2 using an initial reactor charge of 70 parts of acrylonitrile, 2.8 parts of styrene and 75 parts of methyl ethyl ketone and a continuous feed made up of 10 parts of maleic anhydride, 17.8 parts of styrene, 25 parts of methyl ethyl ketone and 0.3 part of azobisisobutyronitrile. The resulting resin was found to have an ASTM heat-distortion temperature of 107° C., a flexural modulus of $6.03\times10^5$ psi, an oxygen transmission rate of 2.7 cc-mil/100 inches$^2$/24 hours/atmosphere and a water vapor transmission rate of 5.4 gm-mil/100 inches$^2$/24 hours/atmosphere.

EXAMPLE 4

A. A copolymer of acrylonitrile and methyl acrylate which is outside the scope of this invention was prepared by adding to a polymerization reactor 75 parts of acrylonitrile, 25 parts of methyl acrylate, 100 parts of methyl ethyl ketone and 0.1 part of azobisisobutyronitrile. The polymerization reaction was carried out for 2 hours at 77° C. with stirring under a nitrogen atmosphere. The polymer was isolated by coagulation with a 1:1 by volume mixture of benzene:petroleum ether. The dried resinous polymer was found to have an ASTM heat-distortion temperature of 76° C., a flexural strength of $21.4 \times 10^3$ psi, a flexural modulus of $6.56 \times 10^5$ psi, a tensile strength of $10.6 \times 10^3$ psi, an oxygen transmission rate of 0.35 cc-mil/100 inches$^2$/24 hours/atmosphere and a water vapor transmission rate of 4.3 gm-mil/100 inches$^2$/24 hours/atmosphere.

B. The procedures of A of this Example was followed except that the ingredients of the polymerization mixture were 70 parts of acrylonitrile, 20 parts of methyl acrylate, 10 parts of maleic anhydride, 100 parts of methyl ethyl ketone and 0.1 part of azobisisobutyronitrile. The resulting polymer was found to have an ASTM heat-distortion temperature of 83° C., a flexural strength of $25.5 \times 10^3$ psi, a flexural modulus of $0.75 \times 10^5$ psi, a tensile strength of $13.4 \times 10^3$ psi, an oxygen transmission rate of 0.24 cc-mil/100 inches$^2$/24 hours/atmosphere and a water vapor transmission rate of 3.2 gm-mil/100 inches$^2$/24 hours/atmosphere.

EXAMPLE 5

The procedure of Example 4A was repeated except that the ingredients of the polymerization mixture were 60 parts of acrylonitrile, 20 parts of methyl acrylate, 20 parts of maleic anhydride, 100 parts of methyl ethyl ketone and 0.1 part of azobisisobutyronitrile. The resulting polymer was found to have an ASTM heat-distortion temperature of 79° C., a flexural strength of $21.7 \times 10^3$ psi, a flexural modulus of $6.49 \times 10^5$ psi and a tensile strength of $16.2 \times 10^3$ psi.

We claim:
1. The process comprising polymerizing in solution in a suitable solvent in the presence of a free-radical initiator and in the substantial absence of molecular oxygen 100 parts by weight of
   (A) from 60 to 90% by weight of at least one nitrile having the structure

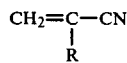

wherein R is hydrogen, a lower alkyl group having from 1 to 4 carbon atoms, or a halogen,
   (B) from 1 to 30% by weight of maleic anhydride, and
   (C) from 5 to 25% by weight of at least one member selected from the group consisting of
     (1) styrene or alpha-methyl styrene,
     (2) an ester having the structure

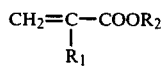

wherein $R_1$ is hydrogen, an alkyl group having from 1 to 4 carbon atoms, or a halogen, and $R_2$ is an alkyl group having from 1 to 6 carbon atoms,
     (3) an alpha-olefin having the structure

wherein R' and R" are alkyl groups having from 1 to 7 carbon atoms,
     (4) a vinyl ether selected from the group consisting of methyl vinyl ether, ethyl vinyl ether, the propyl vinyl ethers, and the butyl vinyl ethers, and
     (5) vinyl acetate,
wherein the weight percentages of (A), (B) and (C) are based on the combined weight of (A) plus (B) plus (C) in the presence of from 1 to 40 parts by weight of
   (D) a rubbery polymer of a conjugated diene monomer selected from the group consisting of butadiene and isoprene and optionally at least one comonomer selected from the group consisting of styrene, a nitrile monomer having the structure

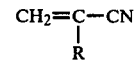

wherein R has the foregoing designation, and an ester having the structure

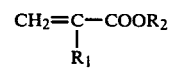

wherein $R_1$ and $R_2$ have the foregoing designations,
said rubbery polymer containing from 0 to 50% by weight of comonomer.
2. The process of claim 1 wherein (A) is acrylonitrile.
3. The process of claim 1 wherein (C) is styrene.
4. The process of claim 1 wherein (C) is methyl acrylate.
5. The process of claim 4 wherein (D) is a butadiene-acrylonitrile copolymer.
6. The polymeric composition resulting from the polymerization in solution of 100 parts by weight of
   (A) from 60 to 90% by weight of at least one nitrile having the structure

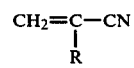

wherein R is hydrogen, a lower alkyl group having from 1 to 4 carbon atoms, or a halogen,
   (B) from 1 to 30% by weight of maleic anhydride, and
   (C) from 5 to 25% by weight of an ester having the structure

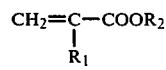

wherein $R_1$ is hydrogen, an alkyl group having from 1 to 4 carbon atoms, or a halogen, and $R_2$ is an alkyl group having from 1 to 6 carbon atoms,
in the presence of from 1 to 40 parts by weight of
   (D) a rubbery polymer of a conjugated diene monomer selected from the group consisting of butadiene and isoprene and optionally at least one monomer selected from the group consisting of styrene, a nitrile monomer having the structure

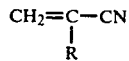

wherein R has the foregoing designation, and an ester having the structure

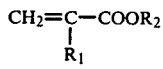

wherein $R_1$ and $R_2$ have the foregoing designations, said rubbery polymer containing from 0 to 50% by weight of comonomer.

7. The composition of claim 6 wherein (A) is acrylonitrile.

8. The composition of claim 7 wherein (C) is styrene.

9. The composition of claim 7 wherein (C) is methyl acrylate.

10. The composition of claim 9 wherein (D) is a butadiene-acrylonitrile copolymer.

* * * * *